(12) United States Patent
Long et al.

(10) Patent No.: US 10,789,295 B2
(45) Date of Patent: Sep. 29, 2020

(54) PATTERN-BASED SEARCHING OF LOG-BASED REPRESENTATIONS OF GRAPH DATABASES

(71) Applicant: Microsoft Technology Licensing, LLC, Redmond, WA (US)

(72) Inventors: Yejuan Long, Union City, CA (US); Scott M. Meyer, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

(21) Appl. No.: 15/278,880

(22) Filed: Sep. 28, 2016

(65) Prior Publication Data

US 2018/0089331 A1   Mar. 29, 2018

(51) Int. Cl.
*G06F 15/16* (2006.01)
*G06F 16/901* (2019.01)
*G06F 16/248* (2019.01)
*G06F 16/23* (2019.01)
*G06F 16/2455* (2019.01)

(52) U.S. Cl.
CPC ...... *G06F 16/9024* (2019.01); *G06F 16/2365* (2019.01); *G06F 16/248* (2019.01); *G06F 16/2455* (2019.01)

(58) Field of Classification Search
CPC combination set(s) only.
See application file for complete search history.

(56) References Cited

U.S. PATENT DOCUMENTS

| | | | |
|---|---|---|---|
| 7,376,639 B2 | 5/2008 | Kutsch | |
| 8,185,558 B1 | 5/2012 | Narayanan | |
| 8,190,546 B2 | 5/2012 | Dong et al. | |
| 8,533,182 B1 | 9/2013 | Charboneau | |
| 8,736,612 B1 | 5/2014 | Goldman | |
| 9,189,520 B2 | 11/2015 | May | |
| 9,292,570 B2 | 3/2016 | Sargeant | |
| 9,330,138 B1* | 5/2016 | Shankar | G06F 17/30427 |
| 9,372,891 B2 | 6/2016 | Elias | |
| 9,378,303 B1 | 6/2016 | Shankar | |
| 9,495,427 B2 | 11/2016 | Abadi | |

(Continued)

FOREIGN PATENT DOCUMENTS

EP   2937797 A1   10/2015

OTHER PUBLICATIONS

"Applicant Initiated Interview Summary Issued in U.S. Appl. No. 15/278,809", dated Jan. 2, 2019, 4 Pages.

(Continued)

*Primary Examiner* — Alex Gofman (74) *Attorney, Agent, or Firm* — Hickman Palermo Becker Bingham LLP (57) ABSTRACT

The disclosed embodiments provide a system that searches a graph database. During operation, the system obtains a log-based representation of a graph database storing a graph, wherein the graph comprises a set of nodes, a set of edges between pairs of nodes in the set of nodes, and a set of predicates. Next, the system obtains a first query containing a first search pattern for searching the log-based representation. The system then matches the first search pattern to one or more records in the log-based representation. Finally, the system outputs, as a first result of the first query, the one or more records in a subgraph of the graph.

19 Claims, 8 Drawing Sheets

(56) References Cited

U.S. PATENT DOCUMENTS

| | | |
|---|---|---|
| 2003/0084043 A1 | 5/2003 | Acharya |
| 2006/0036564 A1 | 2/2006 | Yan et al. |
| 2007/0192306 A1 | 8/2007 | Papakonstantinou |
| 2007/0239694 A1 | 10/2007 | Singh |
| 2008/0116449 A1 | 5/2008 | Macready |
| 2008/0306910 A1 | 12/2008 | Singh |
| 2009/0132503 A1* | 5/2009 | Sun ............... G06F 16/2452 |
| 2009/0240649 A1 | 9/2009 | Sereni |
| 2009/0240682 A1* | 9/2009 | Balmin ............ G06F 16/248 |
| 2010/0057735 A1* | 3/2010 | Srinivasan .......... G06K 9/62 |
| | | 707/E17.014 |
| 2011/0270861 A1 | 11/2011 | Arshavsky |
| 2012/0005224 A1 | 1/2012 | Ahrens |
| 2012/0047114 A1 | 2/2012 | Duan |
| 2012/0096043 A1 | 4/2012 | Stevens, Jr. |
| 2012/0130942 A1* | 5/2012 | Dipper ........... G06F 17/30436 |
| | | 707/602 |
| 2012/0136884 A1 | 5/2012 | Kanawa |
| 2012/0179644 A1 | 7/2012 | Miranker |
| 2012/0246153 A1 | 9/2012 | Pehle |
| 2012/0284255 A1 | 11/2012 | Schechter |
| 2013/0091122 A1 | 4/2013 | Salch |
| 2013/0097180 A1 | 4/2013 | Tseng |
| 2013/0238667 A1 | 9/2013 | Carvalho et al. |
| 2013/0346445 A1 | 12/2013 | Mizell et al. |
| 2014/0156632 A1 | 6/2014 | Yu |
| 2014/0172914 A1 | 6/2014 | Elinkety et al. |
| 2014/0201234 A1 | 7/2014 | Lee et al. |
| 2014/0244687 A1* | 8/2014 | Shmueli ............ G06F 16/28 |
| | | 707/780 |
| 2014/0280044 A1 | 9/2014 | Huynh et al. |
| 2014/0310302 A1 | 10/2014 | Wu |
| 2014/0330867 A1 | 11/2014 | Sarkar |
| 2014/0337373 A1 | 11/2014 | Morsi |
| 2015/0012523 A1 | 1/2015 | Dey |
| 2015/0026158 A1 | 1/2015 | Jin |
| 2015/0052134 A1 | 2/2015 | Bornea |
| 2015/0120717 A1 | 4/2015 | Kim |
| 2015/0120775 A1 | 4/2015 | Shao |
| 2015/0127677 A1 | 5/2015 | Wang |
| 2015/0134637 A1 | 5/2015 | Pall |
| 2015/0149435 A1 | 5/2015 | McKenna |
| 2015/0169686 A1 | 6/2015 | Elias |
| 2015/0234888 A1 | 8/2015 | Ahmed |
| 2015/0269224 A1 | 9/2015 | Kundu |
| 2015/0269228 A1* | 9/2015 | Fisher ............... G06F 16/285 |
| | | 707/722 |
| 2015/0302300 A1 | 10/2015 | Fletcher |
| 2016/0065587 A1 | 3/2016 | Hesselink et al. |
| 2016/0065597 A1 | 3/2016 | Nguyen et al. |
| 2016/0071233 A1* | 3/2016 | Macko ............. G06F 16/9024 |
| | | 345/440 |
| 2016/0171540 A1 | 6/2016 | Mangipudi |
| 2016/0188594 A1 | 6/2016 | Ranganathan |
| 2016/0246842 A1 | 8/2016 | Li |
| 2016/0247170 A1 | 8/2016 | Soulakis et al. |
| 2016/0260011 A1 | 9/2016 | Corvinelli |
| 2016/0371394 A1 | 12/2016 | Shahidi et al. |
| 2017/0010968 A1 | 1/2017 | Li |
| 2017/0123831 A1 | 5/2017 | Byard et al. |

OTHER PUBLICATIONS

"Non-Final Office Action Issued in U.S. Appl. No. 151278,809", dated Oct. 4, 2018, 19 Pages.

"Final Office Action Issued in U.S. Appl. No. 15/278,809", dated Apr. 19, 2019, 18 Pages.

* cited by examiner

PATTERN-BASED SEARCHING OF LOG-BASED REPRESENTATIONS OF GRAPH DATABASES

RELATED APPLICATIONS

The subject matter of this application is related to the subject matter in a co-pending non-provisional application by inventors Yejuan Long, Srikanth Shankar and Scott Meyer, entitled "Verifying Graph-Based Queries," which was filed Sep. 18, 2015 as U.S. patent application Ser. No. 14/858,027 and issued Jun. 28, 2016 as U.S. Pat. No. 9,378,239.

The subject matter of this application is also related to the subject matter in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016.

The subject matter of this application is also related to the subject matter in a co-pending non-provisional application by inventors Yejuan Long, Scott Meyer, Yiming Yang and Mihir Vakharia and filed on the same day as the instant application, entitled "Verifying Correctness in Graph Databases," having Ser. No. 15/278,809, and filing date Sep. 28, 2016.

BACKGROUND

Field

The disclosed embodiments relate to graph databases. More specifically, the disclosed embodiments relate to techniques for performing pattern-based searching of log-based representations of graph databases.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

A variety of approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers, i.e., in a manner consistent with the application's perspective. However, the absence of a relational model means that it can be difficult to optimize a key-value store. Consequently, it can also be difficult to extract complicated relationships from a key-value store (e.g., it may require multiple queries), which can also degrade performance and the user experience when using applications.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
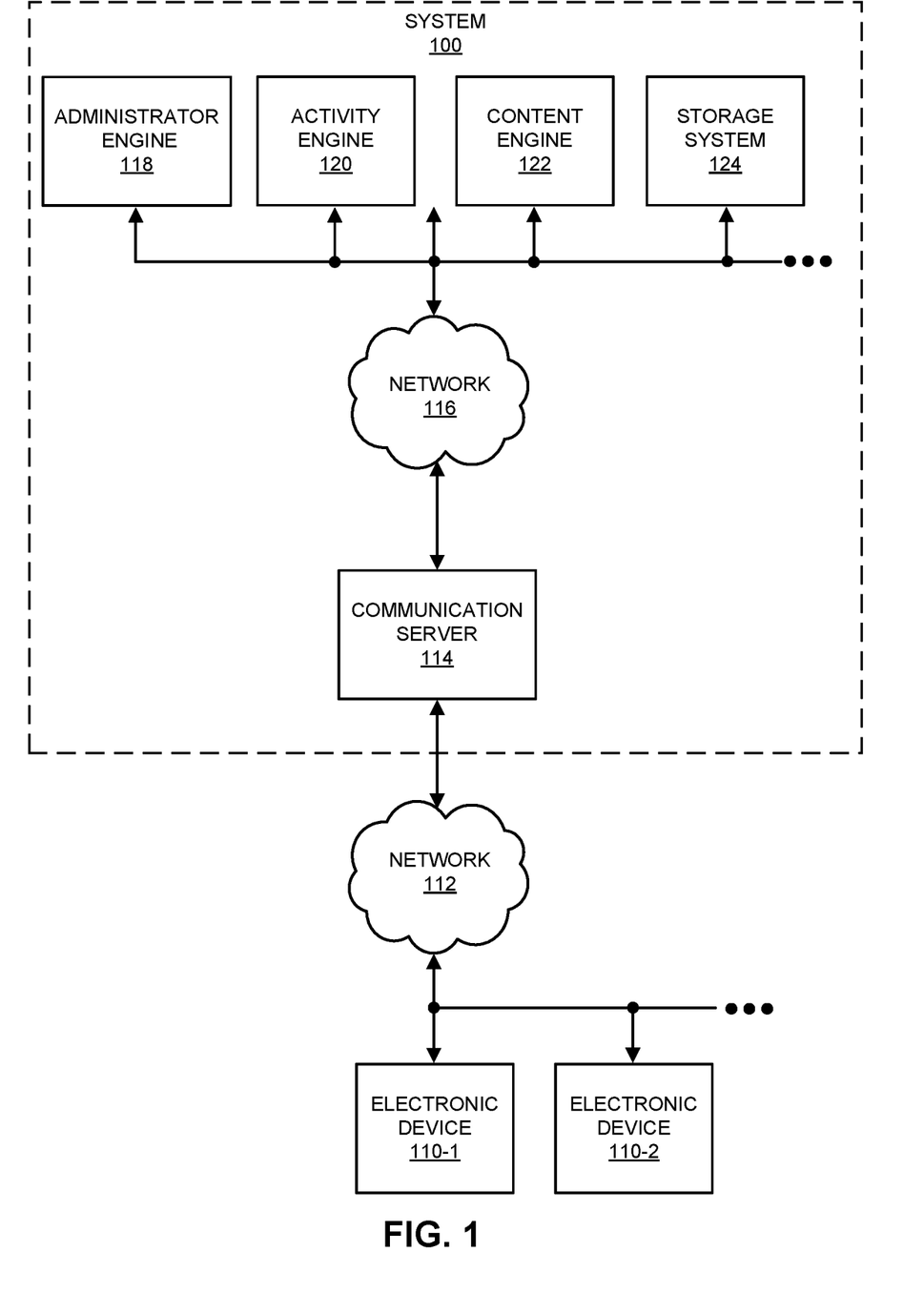
FIG. 1 shows a schematic of a system in accordance with the disclosed embodiments.

The disclosed embodiments provide a method, apparatus and system for testing and searching a graph database. A system 100 for performing a graph-storage technique is shown in FIG. 1. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as an online professional network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale distributed storage system.

Note that each of the users of the social network may have an associated user profile that includes personal and professional characteristics and experiences, which are sometimes collectively referred to as 'attributes' or 'characteristics.' For example, a user profile may include demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then the results may be linked or joined. To illustrate this problem, rendering a web page for a blog may involve a first query for the three-most-recent blog posts, a second query for any associated comments, and a third query for information regarding the authors of the comments. Because the set of queries may be suboptimal, obtaining the results may be time-consuming. This degraded performance may, in turn, degrade the user experience when using the applications and/or the social network.

In order to address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
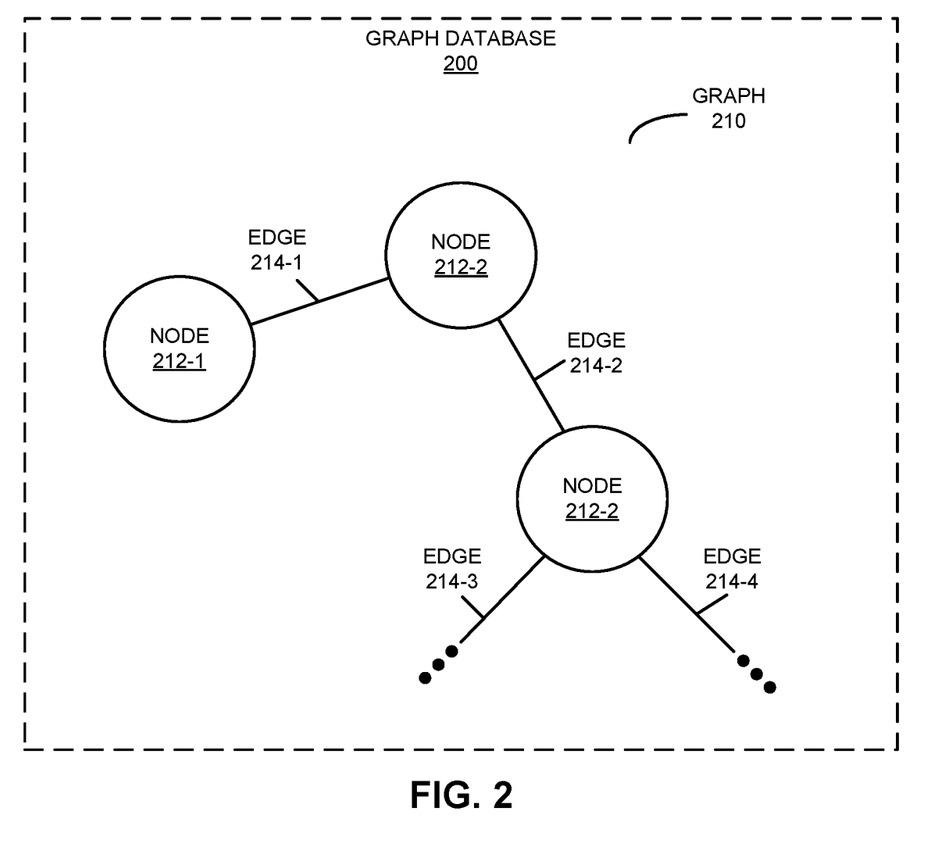
FIG. 2 shows a graph in a graph database in accordance with the disclosed embodiments.

FIG. 2 presents a block diagram illustrating a graph 210 stored in a graph database 200 in system 100 (FIG. 1). Graph 210 includes nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Note that graph database 200 may be an implementation of a relational model with constant-time navigation, i.e., independent of the size N, as opposed to varying as log(N). Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that maintains the structure (i.e., nodes, edges) of the subset of graph 210.

The graph-storage technique may include embodiments of methods that allow the data associated with the applications and/or the social network to be efficiently stored and retrieved from graph database 200. Such methods are described in a co-pending non-provisional application by inventors Yejuan Long, Srikanth Shankar and Scott Meyer, entitled "Verifying Graph-Based Queries," which was filed Sep. 18, 2015 as U.S. patent application Ser. No. 14/858,027 and issued Jun. 28, 2016 as U.S. Pat. No. 9,378,239, which is incorporated herein by reference.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. For example, graph database 200 may be configured to store data associated with a variety of schemas Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
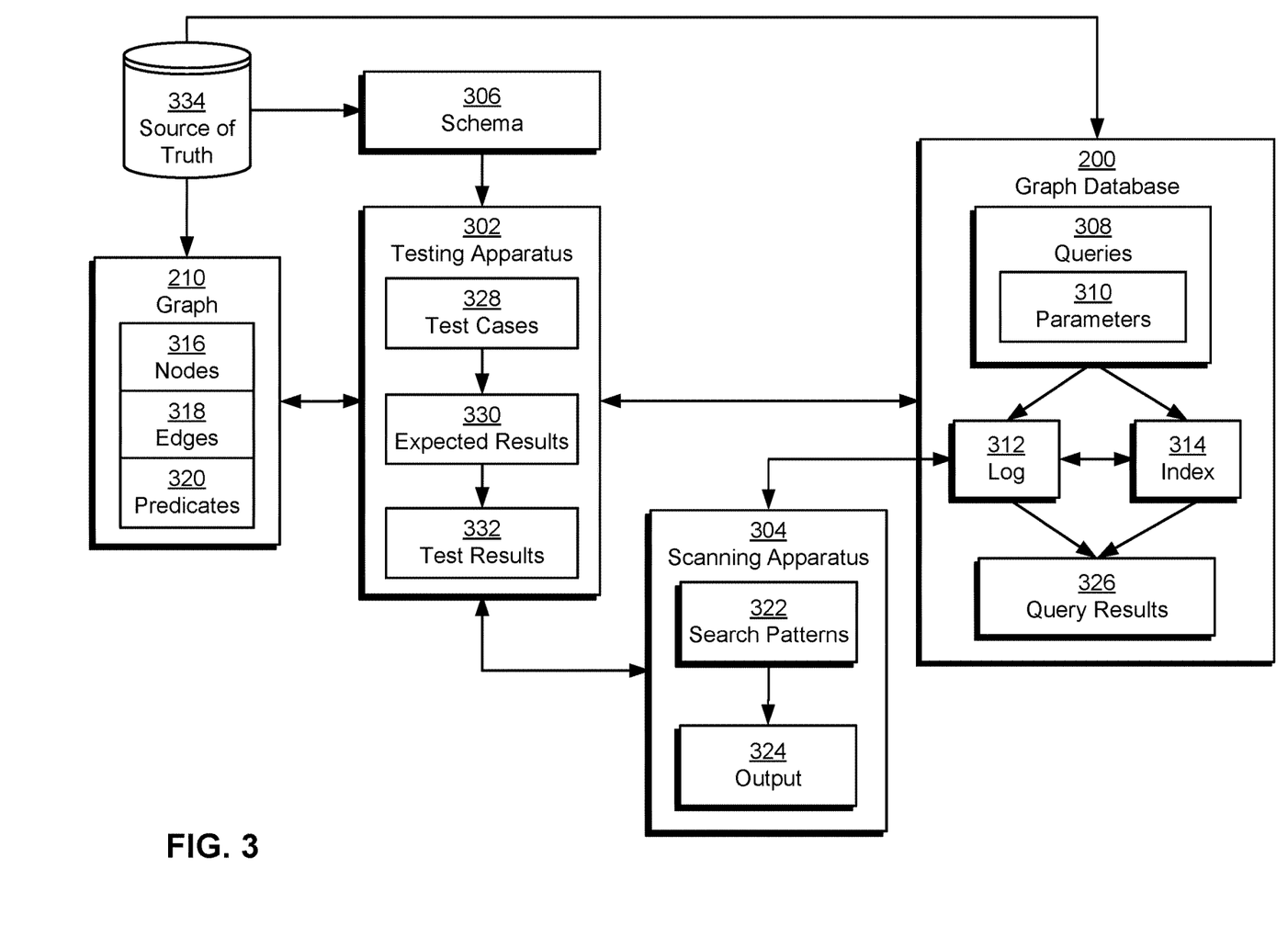
FIG. 3 shows a system for verifying correctness in a graph database in accordance with the disclosed embodiments.

In one or more embodiments, correctness of graph database 200 is verified using a set of test cases that is automatically generated from records in a source of truth for the graph database. As shown in FIG. 3, graph 210 and one or more schemas 306 associated with the graph may be obtained from a source of truth 334 for graph database 200. For example, the graph and schemas may be retrieved from a relational database, distributed filesystem, and/or other storage mechanism providing the source of truth.

As mentioned above, graph 210 may include a set of nodes 316, a set of edges 318 between pairs of nodes, and a set of predicates 320 describing the nodes and/or edges. Each edge in the graph may be specified in a (subject, predicate, object) triple. For example, an edge denoting a connection between two members named "Alice" and "Bob" may be specified using the following statement:

Edge("Alice", "ConnectedTo", "Bob")

In the above statement, "Alice" is the subject, "Bob" is the object, and "ConnectedTo" is the predicate.

In addition, specific types of edges and/or more complex structures in graph 210 may be defined using schemas 306. Continuing with the previous example, a schema for employment of a member at a position within a company may be defined using the following:

```
DefPred("Position/company", "1", "node", "0", "node").
DefPred("Position/member", "1", " node", "0", "node").
DefPred("Position/start", "1", "node", "0", "date").
DefPred("Position/end_date", "1", "node", "0",
   "date").
M2C(positionId, memberId, companyId, start, end) :-
   Edge(positionId, "Position/member", memberId),
   Edge(positionId, "Position/company", companyId),
   Edge(positionId, "Position/start", start),
   Edge(positionId, "Position/end_date", end)
```

In the above schema, the employment is represented by four predicates, followed by a rule with four edges that use the predicates. The predicates include a first predicate representing the position at the company (e.g., "Position/company"), a second predicate representing the position of the member (e.g., "Position/member"), a third predicate representing a start date at the position (e.g., "Position/start"), and a fourth predicate representing an end date at the position (e.g., "Position/end_date"). In the rule, the first edge uses the second predicate to specify a position represented by "positionId" held by a member represented by "memberId," and the second edge uses the first predicate to link the position to a company represented by "companyId." The third edge of the rule uses the third predicate to specify a "start" date of the member at the position, and the fourth edge of the rule uses the fourth predicate to specify an "end" date of the member at the position.

Graph 210 and schemas 306 may additionally be used to populate a graph database 200 for processing queries 308 against the graph. More specifically, a representation of nodes 316, edges 318, and predicates 320 may be obtained from source of truth 334 and stored in a log 312 in the graph database. Lock-free access to the graph database may be implemented by appending changes to graph 210 to the end of the log instead of requiring modification of existing records in the source of truth. In turn, the graph database may provide an in-memory cache of the log and an index 314 for efficient and/or flexible querying of the graph.

In other words, nodes 316, edges 318, and predicates 320 may be stored as offsets in a log 312 that is read into memory in graph database 200. For example, the exemplary edge statement for creating a connection between two members named "Alice" and "Bob" may be stored in a binary log using the following format:

| | |
|---|---|
| 256 | Alice |
| 261 | Bob |
| 264 | ConnectedTo |
| 275 | (256, 264, 261) |

In the above format, each entry in the log is prefaced by a numeric offset representing the number of bytes separating the entry from the beginning of the log. The first entry of "Alice" has an offset of 256, the second entry of "Bob" has an offset of 261, and the third entry of "ConnectedTo" has an offset of 264. The fourth entry has an offset of 275 and stores the connection between "Alice" and "Bob" as the offsets of the previous three entries in the order in which the corresponding fields are specified in the statement used to create the connection (i.e., Edge("Alice", "ConnectedTo", "Bob")).

Because the ordering of changes to graph 210 is preserved in log 312, offsets in the log may be used as representations of virtual time in the graph. More specifically, each offset may represent a different virtual time in the graph, and changes in the log up to the offset may be used to establish a state of the graph at the virtual time. For example, the sequence of changes from the beginning of the log up to a given offset that is greater than 0 may be applied, in the order in which the changes were written, to construct a representation of the graph at the virtual time represented by the offset.

The graph database may also include an in-memory index 314 that enables efficient lookup of edges 318 by subject, predicate, object, and/or other keys or parameters 310. Index structures for graph databases are described in a co-pending non-provisional application by inventors SungJu Cho, Jiahong Zhu, Yinyi Wang, Roman Averbukh, Scott Meyer, Shyam Shankar, Qingpeng Niu and Karan Parikh, entitled "Index Structures for Graph Databases," having Ser. No. 15/058,028 and filing date 1 Mar. 2016, which is incorporated herein by reference.

In one or more embodiments, the system of FIG. 3 includes functionality to verify the correctness of graph database 200 by automatically generating test cases 328 that compare query results 326 from the graph database with expected results 330 generated from records in source of truth 334. More specifically, a testing apparatus 302 may obtain one or more portions of graph 210 from source of truth 334. For example, the testing apparatus may obtain one or more files containing nodes 316, edges 318, and predicates 320 representing relationships, interactions, and/or attributes of some or all users in a social network from a storage mechanism providing the source of truth. The testing apparatus may also, or instead, generate a synthetic data set for use in testing of the graph database and/or retrieve the synthetic data set from the source of truth and/or another data source.

Files and/or data sets used by testing apparatus 302 may be formatted for direct inputting into graph database 200. For example, records in the files and/or data sets may be used to populate log 312 and/or index 314 in the graph database without requiring additional formatting of the records. Because the records can be loaded directly into the graph database, the same records may be used to test and verify the data integrity and/or correctness of the graph database. Alternatively, some or all records used in testing of the graph database may be provided and/or stored in a different format.

Next, testing apparatus 302 may use the records to automatically generate test cases 328 and the corresponding expected results 330. Each test case may contain one or more queries 308 of graph database 200 that are produced from a corresponding record from source of truth 334. For example, the test case may include a query containing parameters 310 that supply all fields in a record from source of truth 334, as well as one or more queries with permutations and/or combinations of unfilled and/or unbounded parameters that can matched to any values in the corresponding fields.

Testing apparatus 302 may also execute test cases 328 by running the queries against graph database 200 and receiving, in response to the queries, query results 326 from the graph database. The testing apparatus and/or a scanning apparatus 304 may then perform one or more comparisons of the query results, expected results 330 of the test cases, and/or output 324 of search patterns 322 associated with the test cases to verify the data correctness of graph database 200.

First, testing apparatus 302 may compare query results 326 with expected results 330 generated using the corresponding records from source of truth 334. For example, the testing apparatus may verify that the query results contain all records from the source of truth that match a query in a test case. Because queries 308 of graph database 200 are processed using both log 312 and index 314, comparison of the query results and expected results may be used to verify that the records are correctly stored in the log and index and that query processing by the graph database is performed correctly. Comparing query results of graph databases with expected results of test cases to verify data correctness in the graph databases is described in further detail below with respect to FIG. 4.

Second, scanning apparatus 304 may use search patterns 322 generated from test cases 328 to retrieve output 324 from log 312 that is formatted as one or more subgraphs of graph 210. For example, the scanning apparatus may obtain offsets, fields, string literals, regular expressions, logical operators, counts, and/or other search patterns from the test cases; match each search pattern to one or more records in a binary file storing the log; and return the matched records as subgraphs of the graph. Because the returned results are in the same format as records in the log and/or graph database, the output of one search pattern can be used as input to an additional search pattern for additional and/or complex querying of records in the log. Pattern-based searching of log-based representations of graph databases is described in further detail below with respect to FIG. 5.

In turn, testing apparatus 302 and/or scanning apparatus 304 may compare output 324 with the corresponding query results 326 and/or expected results 330 to evaluate the success or failure of the corresponding test cases 328. For example, the testing and/or scanning apparatuses may verify that records in the expected results can be found in the corresponding query results from graph database 200 and/or search pattern output associated with log 312. During the verification process, the testing and/or scanning apparatuses may match fields in the expected to the corresponding values and/or offsets in the query results and search pattern output. If fields, values, and/or offsets in the expected results, query results, and search pattern output match, the corresponding test case may be evaluated to have completed successfully. Conversely, if a mismatch is found between the expected results, query results, and/or search pattern output, the test case may be deemed to have failed.

After the success or failure of individual test cases 328 is evaluated, testing apparatus 302 may output test results 332 associated with the test cases. For example, the testing apparatus may generate logs, notifications, alerts, and/or other output containing the test results. The test results may indicate that a test case has completed successfully when query results 326 from graph database 200 and output 324 from scanning apparatus 304 match expected results 330 for the test case. Conversely, the test results may indicate that the test case has failed when the query results and/or output do not match the expected results. When a test case has failed, the testing apparatus may indicate the number and/or percentage of missing and/or incorrect values in the corresponding query results 326 and/or output 324. After all test cases have been executed and evaluated, the testing apparatus may additionally output the overall number and/or percentage of missing and/or incorrect records in the query results and/or search pattern output.

By automatically generating, executing, and analyzing test cases 328 that compare query results 326 and search pattern output 324 from graph database 200 with records from source of truth 334, the system of FIG. 3 may reduce overhead associated with conventional testing techniques that utilize specific queries of graph database 200 and subsequent manual comparison of the query results with corresponding records in the source of truth. In turn, the system of FIG. 3 may be used to detect regression bugs and/or verify the correctness of log 312, index 314, query processing, and/or other aspects of a given version of graph database 200 before the version is deployed to a production environment.

Those skilled in the art will appreciate that the system of FIG. 3 may be implemented in a variety of ways. First, testing apparatus 302, scanning apparatus 304, graph database 200, and/or source of truth 334 may be provided by a single physical machine, multiple computer systems, one or more virtual machines, a grid, one or more databases, one or more filesystems, and/or a cloud computing system. The testing and scanning apparatuses may additionally be implemented together and/or separately by one or more hardware and/or software components and/or layers.

Second, the functionality of testing apparatus 302 and scanning apparatus 304 may be used with other types of databases and/or data. For example, the testing and scanning apparatuses may be configured to automatically verify data integrity and query correctness in other systems that support flexible schemas and/or querying of log-based data structures and/or indexes.

Figure 4:
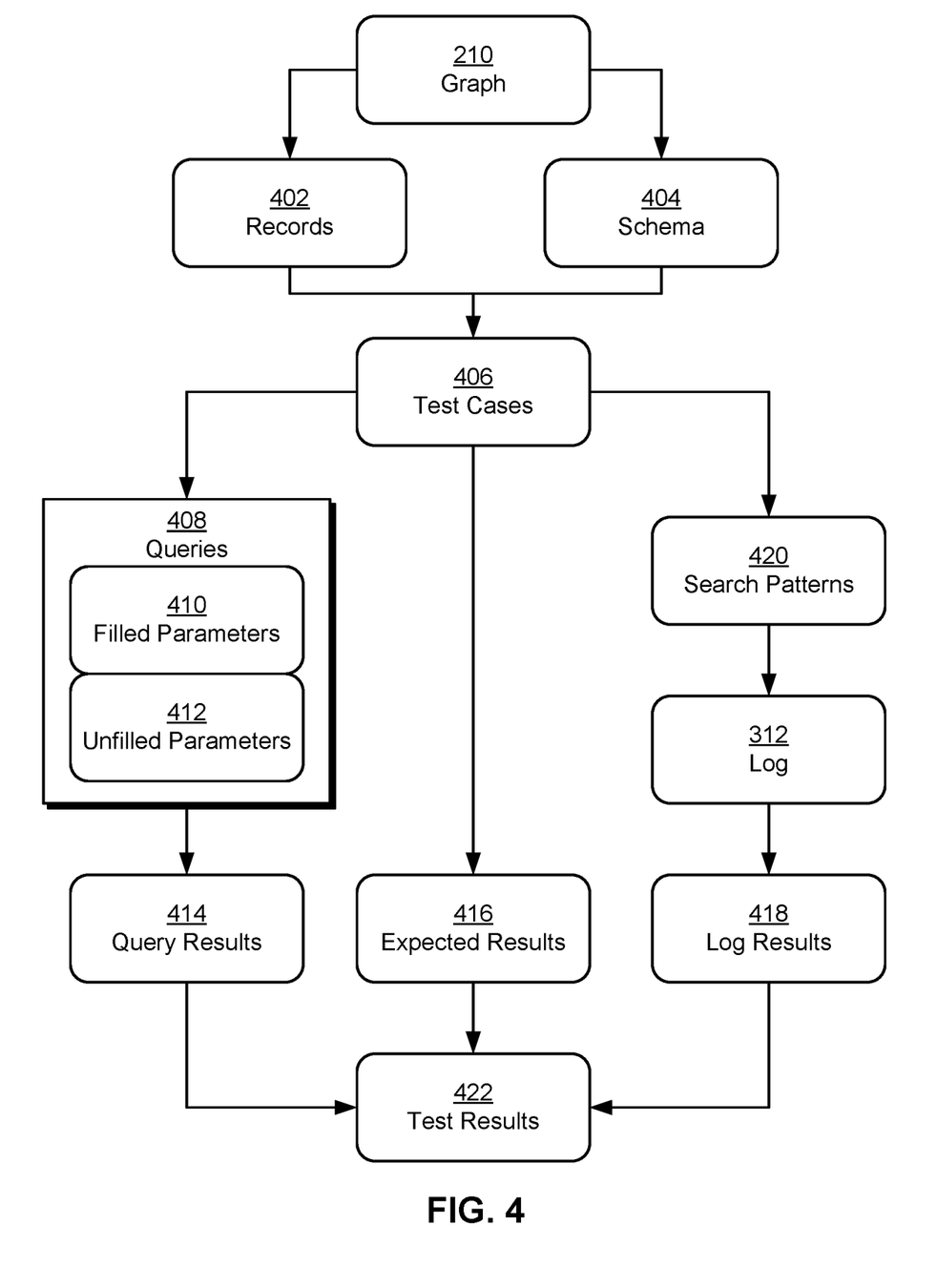
FIG. 4 shows the verification of data correctness in a graph database in accordance with the disclosed embodiments.

FIG. 4 shows the verification of data correctness in a graph database (e.g., graph database 200 of FIG. 2) in accordance with the disclosed embodiments. As described above, the graph database may store an in-memory representation of nodes, edges, predicates, and/or other records 402 in graph 210. Data in the graph may represent real-world relationships, interactions, and/or attributes in a social network. Alternatively, some or all records in the graph may include synthetic data that is used in testing of the graph database.

To initialize the graph database, records 402 may be obtained from a source of truth providing graph 210. For example, records 402 may include a subset of nodes, edges, and/or predicates in the graph and/or synthetic data that is generated for use in testing specific features or aspects of the graph database. A schema 404 that includes one or more rules for defining specific types of edges and/or complex structures in the graph may also be obtained from the source of truth. The graph database may read the records, schema, and other portions of the graph into memory and use the in-memory representation to process queries (e.g., queries 408). As a result, the graph database may be used in flexible and efficient querying of data in graph 210.

To test the correctness of the graph database in processing queries, test cases 406 may be generated from one or more records 402 in graph 210 and the associated schema 404. More specifically, the test cases 406 may include queries 408 of the graph database that are generated from the records and schema. Each query may include one or more filled parameters 410 containing values of fields from a corresponding record and/or one or more unfilled parameters 412 that can be matched to any value in the corresponding field.

After queries 408 are generated using test cases 406, each query may be executed against the graph database and used to retrieve a set of query results 414 from the graph database. The query results may be compared with expected results 416 generated using test cases 406 and/or log results 418 obtained by applying one or more search patterns 420 to log 312 in the graph database to determine the success or failure of the corresponding test cases.

For example, one or more records in the graph database may be created using the exemplary employment schema described above and the following statement:

M2C ("1234", "5678", "9012", "1443657600", "2147483647") .

The period at the end of the above statement may be used to write, in the graph database, records containing employment information for a member with a "memberID" of "5678" at a company with a "companyID" of "9012." The employment information additionally includes a "positionID" of "1234" for the member at the company, a start date with an epoch time of "1443657600," and an end date with an epoch time of "2147483647."

In turn, parameters in the statement may be used to generate a number of test cases containing the following queries, as denoted by question marks at the end of the corresponding statements:

M2C ("1234", "5678", "9012", "1443657600", "2147483647")?
M2C (_, "5678", "9012", "1443657600", "2147483647")?
M2C ("1234", _, "9012", "1443657600", "2147483647")?
M2C ("1234", "5678", _, "1443657600", "2147483647")?

The test cases include a first query that includes all parameters in the corresponding statement, a second query that omits the first parameter in the statement, a third query that omits the second parameter in the statement, and a fourth query that omits the third parameter in the statement. Thus, the first query may be used to retrieve records generated by the statement, which are compared with an expected result containing the following four edges:

Edge("1234", "Position/member", "5678")
Edge("1234", "Position/company", "9012")
Edge("1234", "Position/start", "1443657600")
Edge("1234", "Position/end_date", "2147483647")

The second query may be used to retrieve all records with the same parameters except for an unfilled "positionID" parameter, the third query may be used to retrieve all records with the same parameters except for an unfilled "memberID" parameter, and the fourth query may be used to retrieve all records with the same parameters except for an unfilled "companyID" parameter. Additional queries that omit more than one parameter from the statement may also be included in the test cases.

The records and schema may also be used to generate the following search pattern for the first query:

sub:1234, pred:Position/member, obj:5678 &&
sub:1234, pred:Position/company, obj:9012 &&
sub:1234, pred:Position/start, obj:1443657600 &&
sub:1234, pred:Position/end_date, obj:2147483647

More specifically, the above search pattern may be used to search log 312 for an edge set containing four edges with the same parameters (e.g., subjects, predicates, objects, etc.) as those specified in the statement. In turn, the log result of the search pattern may be compared with the expected results to determine if all four edges created by the statement are stored in the log. Search patterns for log-based representations of graph databases are described in further detail below with respect to FIG. 5.

After query results 414, expected query results 416, and log results 418 are retrieved and/or generated for a given set of test cases 406, the three sets of results may be compared to verify the correctness of the graph database and/or detect issues associated with data integrity and/or query processing in the graph database. For example, a mismatch between the query results and expected query results may indicate an issue with query processing by the graph database and/or an index in the graph database. If the mismatch is also found between the log results and expected query results, the issue may also, or instead, be associated with data integrity in log 312. Finally, any missing values, incorrect values, and/or regression bugs detected by the test cases may be outputted in test results 422 associated with the test cases.

Figure 5:
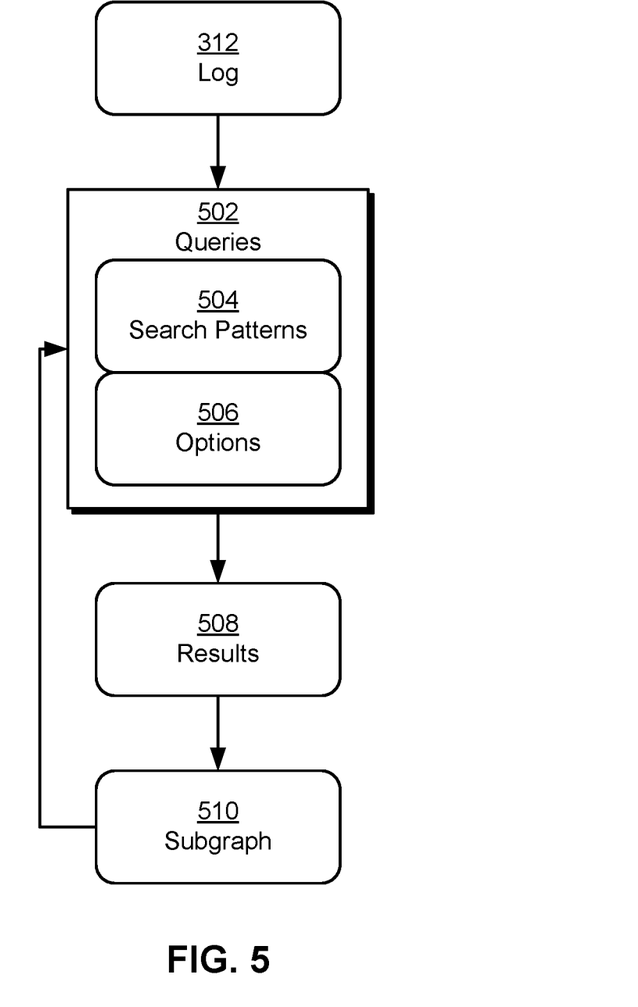
FIG. 5 shows the pattern-based searching of a log-based representation of a graph database in accordance with the disclosed embodiments.

FIG. 5 shows the pattern-based searching of a log-based representation of a graph database (e.g., log 312) in accordance with the disclosed embodiments. As shown in FIG. 5, one or more queries 502 may be used to scan log 312 for records that match one or more search patterns 504. An exemplary syntax for the queries may include the following:

liquid grep <pattern>-ingraph=<filename>

In the above syntax, "liquid grep" may invoke the command for searching the log-based representation, "<pattern>" may represent the search pattern, and "-ingraph=<filename>" may be used to specify a file containing the log.

Search patterns 504 may include values, offsets, counts, logical operators, and/or other attributes related to entries and/or fields in log 312. First, the search patterns may include explicit offsets in the log, which may be specified using the following exemplary query:

liquid grep "offset: 12, 490"-ingraph=test.limg

In the above query, a search pattern of "offset: 12, 490" may be matched to nodes, predicates, edges, and/or other entries in a graph database log named "test.limg" at the offsets of 12 and 490.

Second, search patterns 504 may include linkage patterns for edges in log 312. Each linkage pattern may contain a constraint for the subject, predicate, and/or object in an edge. The constraint may include a string literal, regular expression, offset reference, and/or other value associated with the corresponding field. An exemplary query containing a linkage pattern may include the following:

liquid grep "sub:+68, pred:.*/cardinality"
-ingraph=test.limg

In the above query, a search pattern of "sub:+68, pred:.*/cardinality" may be used to search for edges and/or other entries in the graph database log with subjects that reference the offset of 68 and predicate values that match the regular expression of ".*/cardinality".

An additional exemplary query that specifies a linkage pattern may include the following:

liquid grep "sub:Bob, sub:Mary, pred:.*/cardinality, obj:1" -ingraph=test.limg

In the above query, a search pattern of "sub:Bob, sub:Mary, pred:.*/cardinality, obj:1" may be used to search for edges and/or other entries in the graph database log with subject values that match the string literals of "Bob" or "Mary", predicate values that match the regular expression of ".*cardinality", and object values of "1". Thus, a logical disjunction may be applied to a linkage pattern that specifies two or more values for the same field (e.g., subject, predicate or object) in an edge. Conversely, a logical conjunction may be applied to the same field in a linkage pattern using a double ampersand (e.g., "&&"), such as in the following exemplary query:

liquid grep "sub:Bob && sub:+68, pred:.*/cardinality, obj:1" -ingraph=test.limg

In the above query, a search pattern of "sub:Bob && sub:+68, pred:.*/cardinality" may be used to search for edges and/or other entries in the graph database log with subjects that match the string literal of "Bob" and reference the offset of 68 and predicate values that match the regular expression of ".*/cardinality".

Search patterns 504 may also include a negation of a constraint. An exemplary query containing such a negation may include the following:

liquid grep "~sub:+68, pred:.*/cardinality"
-ingraph=test.limg

In the above query, the search pattern includes a tilde that inverts the subject constraint, so that the graph database log is scanned for edges with subjects that do not reference the offset of 68 and predicate values that match the regular expression of ".*cardinality".

Finally, search patterns 504 may specify a count associated with edges in log 312. An exemplary query for specifying the count may include the following:

liquid grep "sub:+68=2"-ingraph=test.limg

In the above query, a linkage pattern of "sub:+68=2" may be used to determine if the graph database log includes exactly two edges with subjects that reference the offset of 68. Thus, the query may return true if only two edges are found with a subject that references the offset and false if more or less than two edges are found with a subject that references the offset.

Once a given query is submitted, the search pattern in the query may be used to scan log 312, and results 508 of the query may be outputted based on the search pattern and/or one or more options 506 related to processing of the query. For example, the exemplary syntax of the query may include the following:

liquid grep <pattern> -ingraph=<filename> [--symbolic]
[--quiet]

The above syntax may include two non-mandatory options of "--symbolic" and "--quiet". The first option may be used to modify results 508 of the query to contain human-readable symbols (e.g., symbolic names of subjects, objects, and predicates) instead of numeric log offsets. The second option may be used to suppress normal output of the query (e.g., edge values) and, instead, return a Boolean value that indicates if the search pattern successfully matches one or more edges and/or other entries in log 312.

In one or more embodiments, results 508 include a subgraph 510 of the graph stored in log 312. For example, the results may include a subset of records in the log that match the corresponding search patterns 504. The subgraph may additionally be outputted in the same format as entries in the log. As a result, the subgraph may be used as input to one or more additional queries 502 containing additional search patterns 504, and the additional search patterns may be matched to one or more records in the input subgraph. Using the output of one query as the input to an additional query may be specified using the following exemplary statement:

```
liquid grep "sub:Bob, sub:Mary" -ingraph=test.limg |
    liquid grep "sub:*=2"
```

In the above statement, a first query may be used to search the graph database log for edges with subject values of either "Bob" or "Mary." The matching edges may then be inputted into a second query that determines if the results of the first query contain exactly two edges. Because the output of one query can be used as input to a subsequent query, arbitrarily complex queries may be implemented using the search patterns and/or options 506.

As mentioned above, scanning of log 312 using queries 502 may be performed during testing and/or verification of the graph database. For example, the graph database may include the following exemplary schema:

```
DefPred("m2m-left_member", "1", "liquid/node", "0",
    "liquid/string").
DefPred("m2m-right_member", "1", "liquid/node", "0",
    "liquid/string").
m2mM(a, b) :- Edge(h1, "m2m-left_member", a),
    Edge(h1, "m2m-right_member", b).
```

In the above schema, two predicates named "m2m-left_member" and "m2m-right_member" are defined. A "m2mM" rule that uses both predicates is then used to define two edges that associate the first predicate with a parameter named "a" and the second predicate with a parameter named "b." As a result, the schema may be used to define a relationship, interaction, and/or other association between two members represented by "a" and "b" by setting each member as the object of a different edge, with the predicate of the edge indicating the "side" of the association to which the corresponding member belongs.

One or more records may then be written into the graph database using the following statement:
m2mM ("m2", "m4").
To process the statement, the graph database may write two edges into log 312, with the first edge associating "m2" with the "m2m-left_member" predicate and the second edge associating "m4" with the "m2m-right_member" predicate.

The correctness of the graph database may then be verified using a test case that contains the following queries:

```
m2mM("m2", "m4")?
m2mM("m2", _)?
m2mM(_, "m4")?
```

In the test case, the first query includes both parameters of the statement, the second query specifies the first parameter and has an unfilled second parameter, and the third query has an unfilled first parameter and includes the second parameter. Expected results of the first query may include the two edges written into log 312 by the preceding statement. Expected results of the second query may include the same edges, as well as any additional edges associated with the "m2mM" rule that have "m2" as the first parameter and any value for the second parameter. Expected results of the third query may include the same edges, along with any additional edges associated with the "m2mM" rule that have any value for the first parameter and "m4" as the second parameter. All three queries may be executed by the test case to ensure that query processing associated with different parts of the log and/or index in the graph database is performed correctly.

The test case may additionally include the following search pattern:

```
pred:m2m-left_member, obj:m2 &&
pred:m2m-right_member, obj:m4
```

A query containing the search pattern may be executed to verify that log 312 contains the two edges written by the statement.

Figure 6:
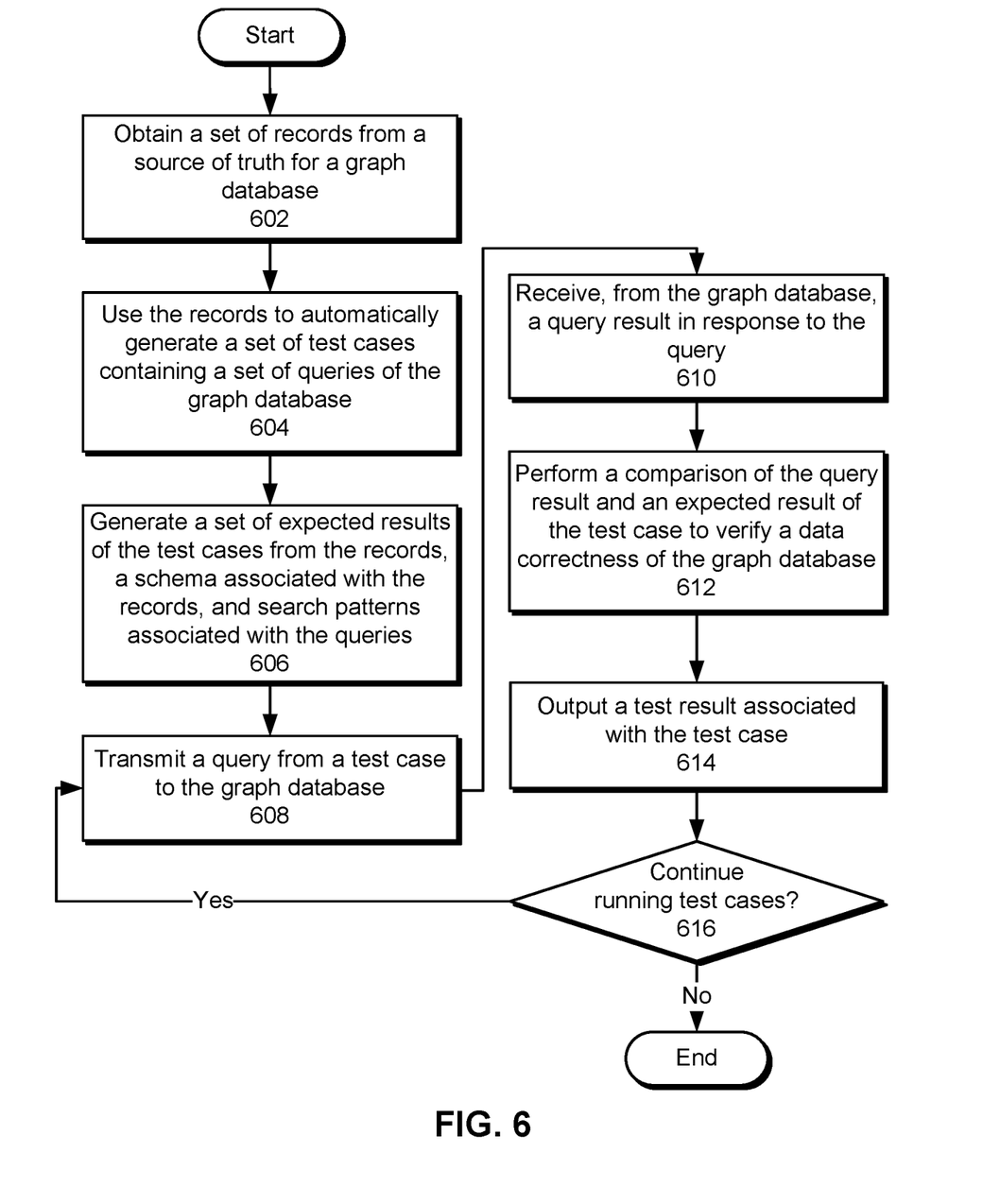
FIG. 6 shows a flowchart illustrating the process of verifying correctness in a graph database in accordance with the disclosed embodiments.

FIG. 6 shows a flowchart illustrating the process of verifying correctness in a graph database in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

Initially, a set of records is obtained from a source of truth for a graph database (operation 602). For example, the records may be obtained from a relational database, distributed filesystem, and/or another storage mechanism providing the source of truth. The records may represent some or all real-world connections, relationships, and/or interactions in a social network, or the records may include synthetic data that is used to test one or more features or aspects of the graph database.

Next, the records are used to automatically generate a set of test cases containing a set of queries of the graph database (operation 604). The test cases may include queries that specify all parameters of records in the source of truth, as well as queries that contain permutations and/or combinations of unfilled parameters from the records. Because the unfilled parameters are matched to any values in the corresponding fields, the corresponding queries may be used to test different portions (e.g., index, log, query processing, etc.) of the graph database and/or verify that flexible querying using the graph database is performed correctly.

A set of expected results of the test cases is also generated from the records, a schema associated with the records, and search patterns associated with the queries (operation 606). For example, the schema and records may be used to generate expected results in the same format as query results from the graph database. The schema and records may also be used to generate search patterns that are used to retrieve records matching the queries from a log-based representation of the graph database. Pattern-based searching of log-based representations of graph databases is described in further detail below with respect to FIG. 7.

After the test cases and expected results are generated, a query from a test case is transmitted to the graph database (operation 608), and a query result is received from the graph database in response to the query (operation 610). For example, the query may specify some or all fields in a record from the source of truth, and the query result may include all edges that contain the specified fields.

A comparison of the query result and an expected result of the test case is then compared to verify a data correctness of the graph database (operation 612). For example, the query result, expected result, and/or search pattern output from scanning the log-based representation may be compared to determine if the record(s) used to generate the test case are found in the log-based representation and returned correctly by the graph database. A test result associated with the test case is also outputted (operation 614). For example, the test result may indicate successful execution of the test case, missing values in the query result and/or records in the log-based representation, incorrect values in the query result and/or records in the log-based representation, and/or a regression in the graph database that is associated with the missing or incorrect values.

Operations 608-614 may be repeated for remaining test cases (operation 616). For example, queries from the test cases may continue to be executed (operation 608), query results may be received and compared with expected results of the test cases (operations 610-612), and test results associated with the test cases may be outputted (operation 614) until all test cases have been executed. The test results may then be aggregated into overall results and/or statistics, such as a total number or percentage of incorrect and/or missing values found by the test cases.

Figure 7:
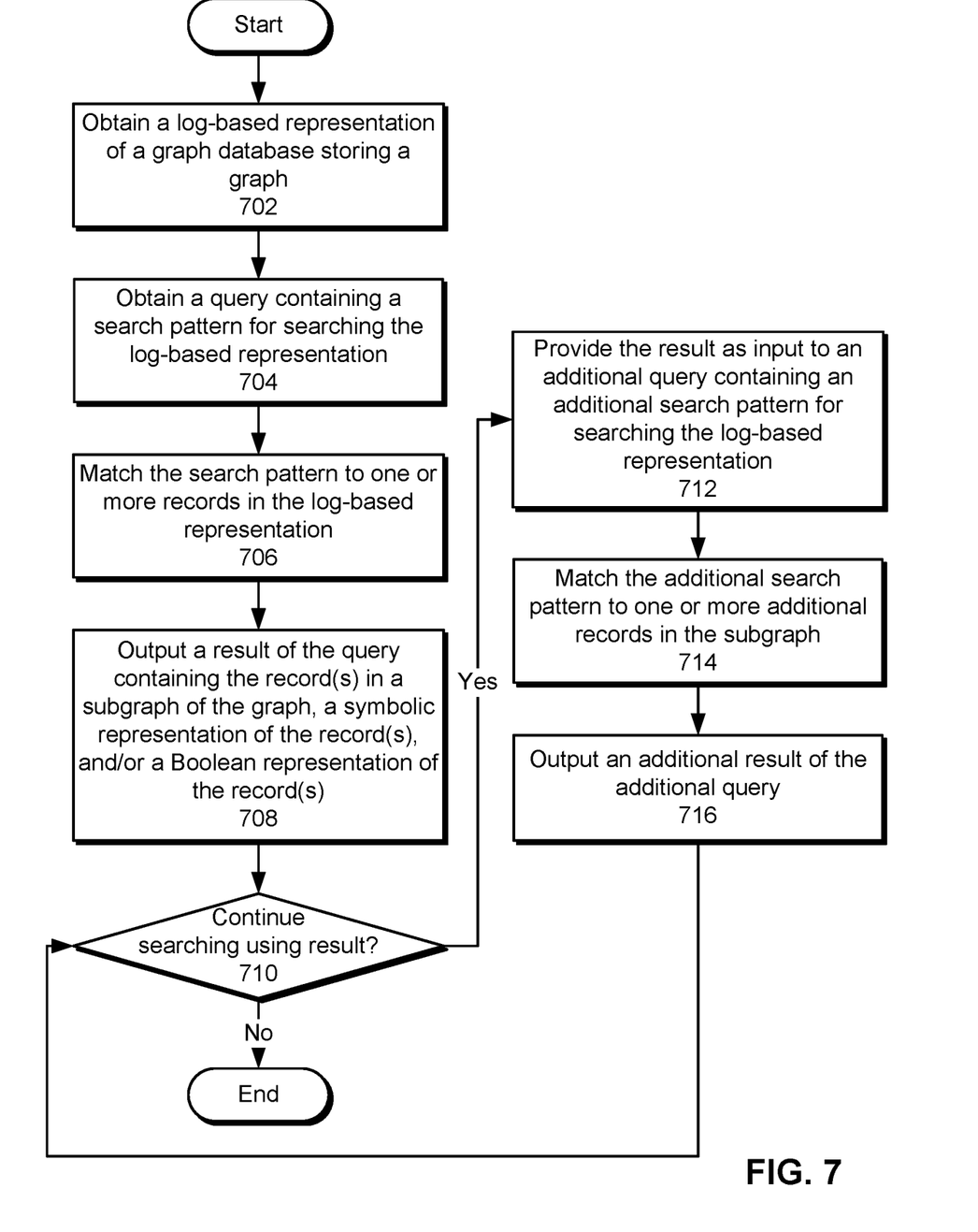
FIG. 7 shows a flowchart illustrating the process of performing pattern-based searching of a log-based representation of a graph database in accordance with the disclosed embodiments.

FIG. 7 shows a flowchart illustrating the process of performing pattern-based searching of a log-based representation of a graph database in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the technique.

First, a log-based representation of a graph database storing a graph is obtained (operation 702). The log-based representation may store nodes, predicates, edges, and/or other changes to the graph in increasing offsets within a binary log file. Next, a query containing a search pattern for searching the log-based representation is obtained (operation 704). The search pattern may include an offset, string (e.g., string literal, regular expression, etc.), logical operator (e.g., conjunction, disjunction, negation, etc.), and/or count associated with a record and/or one or more fields (e.g., subject, predicate, object, etc.) in the record.

The search pattern is matched to one or more records in the log-based representation (operation 706), and a result of the query is outputted as the record(s) in a subgraph of the graph, a symbolic representation of the record(s), and/or a Boolean representation of the record(s) (operation 708). For example, the matching records may be outputted in the format used to store the records in the log-based representation. Alternatively, one or more options associated with the query may be used to output a symbolic representation of the result (e.g., using human-readable symbols or values instead of numeric offsets) and/or a Boolean representation of the result (e.g., indicating the presence or absence of matching records for the query).

The result of the query may be used in subsequent pattern-based searches (operation 710). If searching is to continue using the result, the result is provided as input to an additional query containing an additional search pattern for searching the log-based representation (operation 712). The additional search pattern is then matched to one or more additional records in the subgraph (operation 714), and an additional result of the additional query is outputted (operation 716). Operations 712-716 may be repeated to implement arbitrarily complex queries of the log-based representation.

Figure 8:
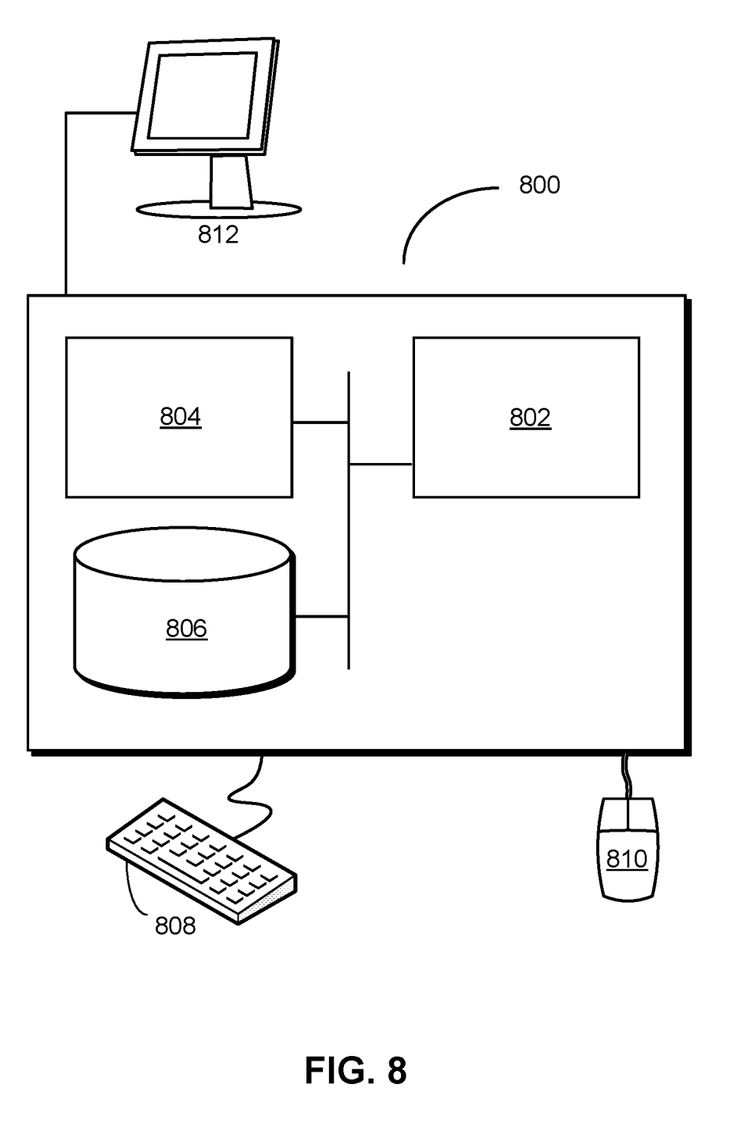
FIG. 8 shows a computer system in accordance with the disclosed embodiments.

FIG. 8 shows a computer system in accordance with the disclosed embodiments. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for verifying correctness in a graph database. The system may include a testing apparatus and a scanning apparatus. The testing apparatus may obtain a set of records from a source of truth for a graph database storing a graph. Next, the testing apparatus may use the records to automatically generate a set of test cases containing a set of queries of the graph database. The testing apparatus may then transmit the queries to the graph database and receive, from the graph database, a set of query results in response to the queries. Finally, the testing apparatus may perform a comparison of the query results and a set of expected results of the test cases to verify a data correctness of the graph database.

The scanning apparatus may obtain a log-based representation of the graph database and a first query containing a first search pattern for searching the log-based representation. Next, the scanning apparatus may match the first search pattern to one or more records in the log-based representation. The scanning apparatus may then output, as a first result of the first query, the record(s) in a subgraph of the graph. The scanning apparatus may also provide the first result as input to a second query containing a second search pattern for searching the log-based representation. The scanning apparatus may then match the second search pattern to one or more additional records in the subgraph and output a second result of the second query. As a result, the output of the scanning apparatus may be used to further verify the data correctness of the graph database. For example, the scanning apparatus may be used to generate or supplement expected results of test cases using search patterns for obtaining records matching queries in the test cases from the log-based representation.

In addition, one or more components of computer system 800 may be remotely located and connected to the other components over a network. Portions of the present embodiments (e.g., testing apparatus, scanning apparatus, graph database, source of truth, etc.) may also be located on different nodes of a distributed system that implements the embodiments. For example, the present embodiments may be implemented using a cloud computing system that performs testing and/or verification of a remote graph database.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   generating a log-based representation of a graph database from a source of truth for the graph database, wherein the graph database stores a graph, wherein the graph comprises a set of nodes, a set of edges between pairs of nodes in the set of nodes, and a set of predicates, and wherein the log-based representation of the graph stores the set of nodes, the set of edges between pairs of nodes in the set of nodes, the set of predicates, and a set of changes to the graph as a set of increasing offsets within a binary log file;
   obtaining a first query comprising a first search pattern for searching the log-based representation, wherein the first search pattern includes at least one numeric offset;
   matching, by one or more computer systems, the first search pattern to one or more records in the log-based representation, which includes matching the at least one numeric offset in the first search pattern with at least one numeric offset in the set of increasing offsets in the log-based representation;
   outputting, as a first result of the first query, the one or more records in a subgraph of the graph;
   obtaining a second result of the first query by running the first query against the graph database; and
   comparing the first result and the second result to verify a data correctness of the log-based representation of the graph database.

2. The method of claim 1, further comprising:
   providing the first result as input to a second query comprising a second search pattern for searching the log-based representation;
   matching the second search pattern to one or more additional records in the subgraph; and
   outputting a second result of the second query.

3. The method of claim 1, further comprising:
   obtaining, from a second query, a second search pattern for searching the log-based representation; and
   generating a second result of the second query based on one or more options associated with the second query.

4. The method of claim 3, wherein the one or more options are associated with at least one of:
   a symbolic representation of one or more additional records in the second result; and
   a Boolean representation of the one or more additional records.

5. The method of claim 1, wherein the first search pattern comprises an offset in the log-based representation.

6. The method of claim 1, wherein the first search pattern comprises at least one of:
   a subject;
   a predicate; and
   an object.

7. The method of claim 1, wherein the first search pattern comprises a string.

8. The method of claim 1, wherein the first search pattern comprises a logical operator.

9. The method of claim 8, wherein the logical operator is at least one of:
   a conjunction;
   a disjunction; and
   a negation.

10. The method of claim 1, wherein the first search pattern comprises a count of the one or more records.

11. An apparatus, comprising:
    one or more processors; and
    memory storing instructions that, when executed by the one or more processors, cause the apparatus to:
      generate a log-based representation of a graph database from a source of truth for the graph database, wherein the graph database stores a graph, wherein the graph comprises a set of nodes, a set of edges between pairs of nodes in the set of nodes, and a set of predicates, and wherein the log-based representation of the graph stores the set of nodes, the set of edges between pairs of nodes in the set of nodes, the set of predicates, and a set of changes to the graph as a set of increasing offsets within a binary log file;
      obtain a first query comprising a first search pattern for searching the log-based representation, wherein the first search pattern includes at least one numeric offset;
      match the first search pattern to one or more records in the log-based representation, which includes matching the at least one numeric offset in the first search pattern with at least one numeric offset in the set of increasing offsets in the log-based representation;
      output, as a first result of the first query, the one or more records in a subgraph of the graph;
      obtain a second result of the first query by running the first query against the graph database; and
      compare the first result and the second result to verify a data correctness of the log-based representation of the graph database.

12. The apparatus of claim 11, wherein the memory further stores instructions that, when executed by the one or more processors, cause the apparatus to:
    provide the first result as input to a second query comprising a second search pattern for searching the log-based representation;
    match the second search pattern to one or more additional records in the subgraph; and
    output a second result of the second query.

13. The apparatus of claim 11, wherein the memory further stores instructions that, when executed by the one or more processors, cause the apparatus to:
    obtain, from a second query, a second search pattern for searching the log-based representation; and
    generate a second result of the second query based on one or more options associated with the second query.

14. The apparatus of claim 13, wherein the one or more options are associated with at least one of:
    a symbolic representation of one or more additional records in the second result; and
    a Boolean representation of the one or more additional records.

15. The apparatus of claim 11, wherein the first search pattern comprises at least one of:
    an offset in the log-based representation;
    a string;
    a logical operator; and
    a count of the one or more records.

16. The apparatus of claim 15, wherein the string is at least one of:
    a string literal; and
    a regular expression.

17. A system, comprising:
a graph database storing a graph, wherein the graph comprises a set of nodes, a set of edges between pairs of nodes in the set of nodes, and a set of predicates; and
a scanning module comprising a non-transitory computer-readable medium comprising instructions that, when executed, cause the system to:
generate a log-based representation of the graph database from a source of truth for the graph database, wherein the log-based representation of the graph stores the set of nodes, the set of edges between pairs of nodes in the set of nodes, the set of predicates, and a set of changes to the graph as a set of increasing offsets within a binary log file;
obtain a first query comprising a first search pattern for searching the log-based representation, wherein the first search pattern includes at least one numeric offset;
match the first search pattern to one or more records in the log-based representation, which includes matching the at least one numeric offset in the first search pattern with at least one numeric offset in the set of increasing offsets in the log-based representation;
output, as a first result of the first query, the one or more records in a subgraph of the graph; and
a verification module comprising instructions that, when executed, cause the system to:
obtain a second result of the first query by running the first query against the graph database; and
compare the first result and the second result to verify a data correctness of the log-based representation of the graph database.

18. The system of claim 17, wherein the non-transitory computer-readable medium of the scanning module further comprises instructions that, when executed, cause the system to:
provide the first result as input to a second query comprising a second search pattern for searching the log-based representation;
match the second search pattern to one or more additional records in the subgraph; and
output a second result of the second query.

19. The system of claim 17, wherein the non-transitory computer-readable medium of the scanning module further comprises instructions that, when executed, cause the system to:
obtain, from a second query, a second search pattern for searching the log-based representation; and
generate a second result of the second query based on one or more options associated with the second query.

* * * * *